United States Patent
Fanara et al.

(10) Patent No.: US 11,449,642 B2
(45) Date of Patent: Sep. 20, 2022

(54) ATTACK PROTECTION BY POWER SIGNATURE BLURRING

(71) Applicant: Arm Limited, Cambridge (GB)

(72) Inventors: Carlo Dario Fanara, Antibes (FR); Frederic Jean Denis Arsanto, Le Rouret (FR); Luca Scalabrino, Villeneuve Loubet (FR)

(73) Assignee: Arm Limited, Cambridge (GB)

( * ) Notice: Subject to any disclaimer, the term of this patent is extended or adjusted under 35 U.S.C. 154(b) by 190 days.

(21) Appl. No.: 17/012,470

(22) Filed: Sep. 4, 2020

(65) Prior Publication Data
US 2022/0075901 A1    Mar. 10, 2022

(51) Int. Cl.
*G06F 21/75*    (2013.01)

(52) U.S. Cl.
CPC ................................ *G06F 21/755* (2017.08)

(58) Field of Classification Search
CPC .......... G06F 21/70; G06F 21/71; G06F 21/75; G06F 21/755
See application file for complete search history.

(56) References Cited

U.S. PATENT DOCUMENTS

| | | | |
|---|---|---|---|
| 2007/0180541 A1* | 8/2007 | Shu | G06F 9/3001 726/34 |
| 2011/0285420 A1* | 11/2011 | Deas | H04L 9/003 326/8 |
| 2013/0054991 A1* | 2/2013 | Kaluzhny | G06F 7/00 713/320 |
| 2014/0098951 A1* | 4/2014 | Choi | H04L 9/3066 380/28 |
| 2016/0371487 A1* | 12/2016 | Poornachandran | G06F 21/575 |
| 2017/0262630 A1* | 9/2017 | Teper | G09C 1/00 |
| 2017/0288855 A1* | 10/2017 | Kumar | H04L 9/0631 |
| 2020/0226294 A1* | 7/2020 | Kim | G06F 21/755 |
| 2020/0335938 A1* | 10/2020 | Dworak | H01S 5/042 |

* cited by examiner

Primary Examiner — Baotran N To
(74) Attorney, Agent, or Firm — Quinn IP Law (57) ABSTRACT

An electronic circuit includes a plurality of processing elements, a register bank, and a control circuit. The processing elements consume power by processing a plurality of operands to generate a plurality of result values. The register bank has a plurality of registers. The control circuit is configured to determine one or more unused processing elements among the processing elements by snooping one or more incoming operands and an instruction type, control routing of one or more random operands from the register bank to the unused processing elements, and control routing of a random result value generated by one of the unused processing elements into a trash register of the registers. The power consumed by the unused processing elements in the generation of the random result value and a write of the random result value into the trash register temporally blurs a total power consumed by the electronic circuit.

20 Claims, 7 Drawing Sheets

ATTACK PROTECTION BY POWER SIGNATURE BLURRING

INTRODUCTION

A side-channel attack is an attack based on a design of a circuit. Timing information, power consumption, and electromagnetic leakage information of the circuit can be measured to determine operational characteristics. The operational characteristics, in turn, can be exploited to determine data being processed within the circuit. The attacks pose threats in situations where the data is meant to be kept inside the circuit and thus a secret to the outside world. For example, the secret data may be keys utilized in cryptographic operations. By monitoring the power consumption of the circuit during the cryptographic operations, attackers can sometimes successfully steal the keys.

SUMMARY

An electronic circuit is provided herein. The electronic circuit includes a plurality of processing elements, a register bank, and a control circuit. The plurality of processing elements consumes power by processing a plurality of operands to generate a plurality of result values. The register bank has a plurality of registers. The control circuit is configured to determine one or more unused processing elements among the plurality of processing elements by snooping one or more incoming operands and an instruction type, control routing of one or more random operands from the register bank to the unused processing elements, and control routing of a random result value generated by one of the unused processing elements into a trash register of the plurality of registers. The power consumed by the unused processing elements in the generation of the random result value and a write of the random result value into the trash register temporally blurs a total power consumed by the electronic circuit.

A method of protecting a circuit from a side-channel attack is provided herein. The method includes consuming power by processing one or more operands in a plurality of processing elements of the circuit to generate a plurality of result values, determining one or more unused processing elements among the plurality of processing elements by snooping one or more incoming operands and an instruction type, controlling a route of one or more random operands from a plurality of registers to the unused processing elements, generating a random result value by processing the one or more random operands in one of the unused processing elements, and controlling an additional route of the random result value to a trash register of the plurality of registers. The power consumed by the unused processing elements in the generation of the random result value and a write of the random result value into the trash register temporally blurs a total power consumed by the circuit.

A non-transitory computer readable storage medium storing a library cell defining an electronic circuit is provided herein. The electronic circuit includes an interface, a plurality of processing elements, a register bank, and a control circuit. The interface is configured to receive power. The plurality of processing elements is coupled to the interface and consumes the power by processing a plurality of operands to generate a plurality of result values. The register bank has a plurality of registers. The control circuit is configured to determine one or more unused processing elements among the plurality of processing elements by snooping one or more incoming operands and an instruction type, control routing of one or more random operands from the register bank to the unused processing elements, and control routing of a random result value generated by one of the unused processing elements into a trash register of the plurality of registers. The power consumed by the unused processing elements in the generation of the random result value and a write of the random result value into the trash register temporally blurs a total power consumed by the electronic circuit.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally create temporally blurring in a power signature of an electronic circuit by processing data at random and subsequently writing a random result value into a free write port of a register bank. The randomness of the power blurring includes processing random data, random selection among unused processes, random selection among a set of functions that consume different amounts of electrical power, random timing of when to process the data, and/or random selection of writeback paths used to store the random result value.

In various embodiments, the power blurring is implemented in a pipelined processor having a register bank with dual write ports. Knowing that some processor designs often use one write port at the same time, a free write port may be used to write the random result value in the register bank. Concurrently, the other write port may be used to write a normal result value in the register bank. The random result value and the normal result value are generated during the same clock cycle thereby changing (e.g., increasing) a total amount of power consumed by the circuit during that clock cycle compared with a generation of the normal result value alone. In some embodiments, the random result value may be stored in a trash register within the register bank. For example, a common register (e.g., R15) may be mapped to act as the trash register. The normal result value may be stored in another register. Since the timing, the data, and/or the processing are randomly chosen (for example, with an external key), the power signature of the electronic circuit is blurred in time.

Figure 1:
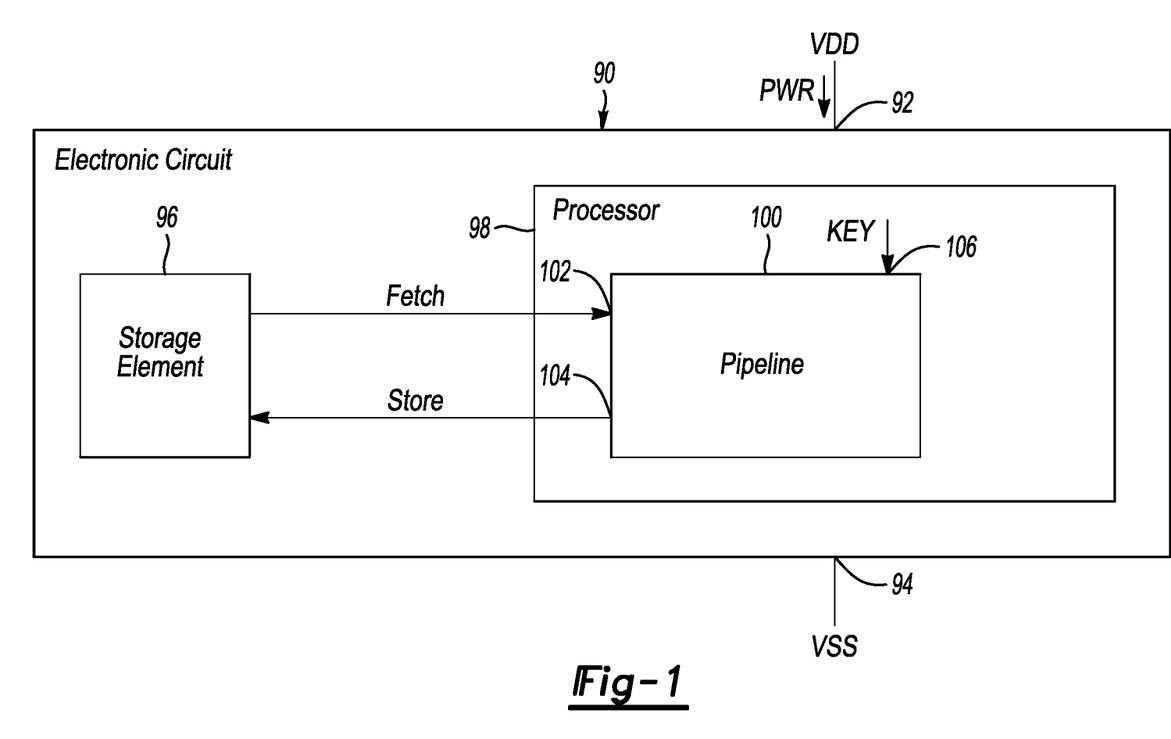
FIG. 1 is a schematic diagram of an electronic circuit in accordance with an exemplary embodiment.

Referring to FIG. 1, a schematic diagram of an example implementation of an electronic circuit 90 is shown in accordance with an exemplary embodiment. The electronic circuit 90 may be implemented as part of a system-on-a-chip, an integrated circuit, a chip, and/or a die. The electronic circuit 90 generally includes a supply voltage interface 92, a reference voltage interface 94, a storage element 96, and a processor 98. In various embodiments, the processor 98 includes a pipeline 100. The pipeline 100 includes a fetch interface 102, a store interface 104, and a key interface 106.

A voltage domain of the electronic circuit 90 is defined by a voltage difference between a supply voltage (e.g., VDD) and a reference voltage (e.g., VSS). The voltage domain typically provides around 0.6 volts direct current (Vdc) to 1.9 Vdc to the electronic circuit 90. Other voltages may be implemented to meet the design criteria of a particular application. The supply voltage VDD is coupled to the supply voltage interface 92. The reference voltage VSS is coupled to the reference voltage interface 94.

A power signal (e.g., PWR) may be received by the processor 98 at the supply voltage interface 92. The power signal PWR may be an electrical current that is proportional to a total power consumed by the electronic circuit as a function of time. A fetch signal (e.g., FETCH) may be generated by the storage element 96 and received by the processor 98 (e.g., at the fetch interface 102 of the pipeline 100). The signal FETCH may convey data read from the storage element 96 by the processor 98. A store signal (e.g., STORE) may be generated by the processor 98 (e.g., at the store interface 104 of the pipeline 100) and presented to the storage element 96. The signal STORE may transfer data to be held in the storage element 96. A key signal (e.g., KEY) may be received at the key interface 106 of the pipeline 100. The key signal KEY may convey a key value. The key value may be a single random number, or a sequence of random numbers used by the pipeline 100 to blur the power signature of the electronic circuit 90. The key value(s) may be generated within the electronic circuit 90 and/or received from a random number generator external to the electronic circuit 90.

The electronic circuit 90 may be implemented within, but is not limited to, automotive circuitry (e.g., automotive Internet-of-Things), server computers, cloud server computers, neural networks, communication networks, portable electronic devices, cellular telephones, digital cameras, and the like. The electronic circuit 90 may be implemented where secure processing capabilities are specified. Other functionality may be implemented in the electronic circuit 90 to meet a design criteria of a particular application.

The storage element 96 is implemented as multiple addressable storage locations. Each storage location is operational to accept write data via the signal STORE and present read information via the signal FETCH. The read information includes executable programming instructions and read data. The storage element 96 may be implemented as a volatile storage element and/or a nonvolatile storage element. In various embodiments, the storage element 96 may hold the information in units of bytes, words, long words, and the like.

The processor 98 is implemented as a pipelined processor. The processor is operational to perform a variety of operations by executing the programming instructions (or code). The data consumed by the operations may be stored internal to the processor 98 and/or received from the storage element 96. Result values generated by the operations may be stored internally to the processor 98 and/or presented to the storage element 96.

The pipeline 100 is implemented as a multistage instruction pipeline. The pipeline 100 is operational to perform a variety of arithmetic operations, bitwise operations, and/or logical operations that generate the result values. The stages may be implemented with hardware. In some embodiments, the pipeline 100 may implement a 3-stage pipeline. An initial stage of the 3 stages is a fetch stage operational to fetch the instructions and data from the storage element 96. An execute/writeback stage is operational to decode, perform basic functions in a single-precision (e.g., 32-bit) environment, and provide an initial writeback of the result values to an internal register file. A complex-execute/writeback stage is operational to perform complex functions in a double-precision (e.g., 64-bit) environment. The complex-execute/writeback stage is operational to transfer writeback result values of the complex functions back to the execute/writeback stage for storage in the register bank. In various embodiments, the pipeline 100 may implement a 5-stage pipeline. The initial stage of the 5 stages is the fetch stage. A decode stage is operational to decode the instructions into opcodes. An execute stage is operational to perform the arithmetic operations, the bitwise operations, and/or the logical operations. A memory access stage is operational to write the result values back into the storage element 96. A register writeback stage writes the function result values back into the register bank. Other numbers of pipeline stages and/or other functions in the stages may be implemented to meet a design criteria of a particular application.

Figure 2:
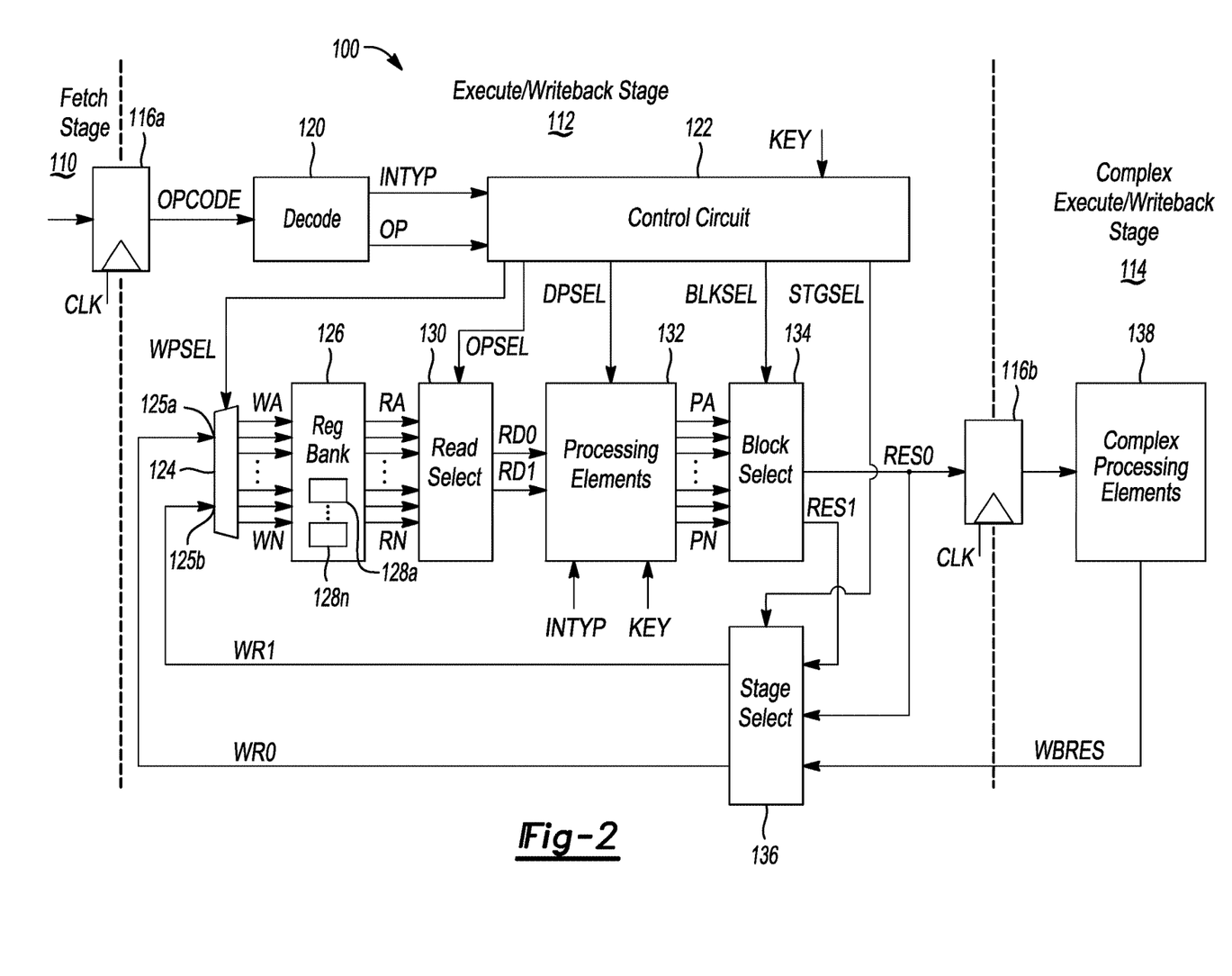
FIG. 2 is a partial schematic diagram of a pipeline in the electronic circuit in accordance with an exemplary embodiment.

Referring to FIG. 2, a partial schematic diagram of an example implementation of the pipeline 100 is shown in accordance with an exemplary embodiment. The pipeline 100 includes a fetch stage 110, an execute/writeback stage 112, and a complex-execute/writeback stage 114. The stage 110 and the stage 112 are coupled by one or more stage registers 116a (one shown). The stage 112 and the stage 114 are coupled by one or more stage registers 116b (one shown). The execute/writeback stage 112 may include a decode circuit 120, a control circuit 122, a write demultiplexer 124 having multiple write ports 125a-125b, a register bank 126 having multiple registers 128a-128n, a read select circuit 130, a processing elements circuit 132, a block select circuit 134, and a stage select circuit 136. The complex-execute/writeback stage 114 includes a complex processing elements circuit 138.

A clock signal (e.g., CLK) is received by the stage registers 116a-116b. The clock signal CLK provides synchronization timing between the stages 110-114. The key signal KEY is received by the control circuit 122. In various embodiments, the key signal KEY may also be received by the processing elements circuit 132.

An operation code signal (e.g., OPCODE) is received by the fetch stage 110 from the storage element 96 and presented through the stage register 116a to the decode circuit 120. The operation code signal OPCODE conveys operation codes (also referred to as opcodes) that control execution in the execute/writeback stage 112 and the complex-execute/writeback stage 114. An instruction type signal (e.g., INTYP) is generated by the decode circuit 120 and presented to the control circuit 122 and the processing elements circuit 132. The instruction type signal INTYP identifies the types of operations (or functions) to be performed in the execute/writeback stage 112 and/or the complex-execute/writeback stage 114. An incoming operand signal (e.g., OP) is generated by the decode circuit 120 and transferred to the control circuit 122. The incoming operand signal OP carries one or more operands used in the operations performed in the execute/writeback stage 112 and/or the complex-execute/writeback stage 114. In various situations, the incoming operands may be one or more source operands and a destination operand. Each operand may identify a register, identify an address, identify a stack value, convey a numerical value, or convey a label.

A write port select signal (e.g., WPSEL) is generated by the control circuit 122 and presented to the write demultiplexer 124. The write port select signal WPSEL controls how the data at the write ports 125a-125b of the write demultiplexer 124 is routed to selected registers 128a-128n in the register bank 126. Multiple write signals (e.g., WA-WN) are generated by the write demultiplexer 124 and presented to the register bank 126. The write signals WA-WN carry write data (e.g., result values) to be stored in the register bank 126. The register bank 126 generates multiple read signals (e.g., RA-RN) that are received by the read select circuit 130. The read signals RA-RN transfer read data (e.g., operands) available for consumption by the processing elements circuit 132 while performing the decoded instruction.

An operand select signal (e.g., OPSEL) is generated by the control circuit 122 and presented to the read select circuit 130. The operand select signal OPSEL controls selection of one or two of the operands stored in the read signals RA-RN for use by the processing elements circuit 132. Multiple (e.g., two) selected read signals (e.g., RD0-RD1) are generated by the read select circuit 130 and presented to the processing elements circuit 132. The selected read signals RD0-RD1 transfer the operands selected by the operand select signal OPSEL to the processing elements circuit 132.

A datapath select signal (e.g., DPSEL) is generated by the control circuit 122 and presented to the processing elements circuit 132. The datapath select signal DPSEL controls selection among one or two operations in the processing elements circuit 132 to process the operands received in the selected operands signals RD0-RD1. Multiple intermediate result signals (e.g., PA-PN) are generated by the processing elements circuit 132 and transferred to the block select circuit 134. The intermediate result signals PA-PN contain result values generated by the different individual processing elements within the processing elements circuit 132.

A block select signal (e.g., BLKSEL) is generated by the control circuit 122 and presented to the block select circuit 134. The block select signal BLKSEL controls selection among one or two of the result values received from the processing elements circuit 132 in the intermediate result signals PA-PN. Multiple selected result signals RES0-RES1 are generated by the block select circuit 134. The selected result signal RES0 is presented to the stage register 116b and the stage select circuit 136. The selected result signal RES1 is presented to the stage select circuit 136. The selected result signals RES0-RES1 convey the result values from the intermediate result signals PA-PN as selected by the control circuit 122. The selected result signals RES0-RES1 may each transfer the result values as single-precision (e.g., 32-bit) data. Other data widths may be implemented to meet the design criteria of a particular application.

The stage register 116b receives the selected result signal RES0 and stores the result value contained therein during a current clock cycle. At a start of a next clock cycle, the result value is transferred to the complex processing elements circuit 138 in the complex-execute/writeback stage 114. A writeback result signal (e.g., WBRES) is generated by the complex processing elements circuit 138 and received by the stage select circuit 136. The writeback result signal WBRES transfers the writeback result values generated by the complex processing elements circuit 138 based on the selected result values stored in the stage register 116b. The writeback result signal WBRES may transfer the writeback result values as double-precision (e.g., 64-bit) data. Other data widths may be implemented to meet the design criteria of a particular application.

A stage select signal (e.g., STGSEL) is generated by the control circuit 122 and received by the stage select circuit 136. The stage select signal STGSEL controls selection of result values generated by the execute/writeback stage 112 and the complex-execute/writeback stage 114. The stage select circuit 136 generates multiple selected write signals (e.g., WR0-WR1) that are received at the write ports 125a-125b of the write demultiplexer 124. The selected write signals WR0-WR1 convey the result values chosen among the selected result values in the selected result signals RES0-RES1 and the writeback result signal WBRES.

The fetch stage 110 is coupled to the storage element 96. The fetch stage 110 is operational to receive the opcodes (or machine code instructions) from the storage element 96 in the signal FETCH. The opcodes are stored in the stage register 116a and subsequently passed to the execute/writeback stage 112.

The execute/writeback stage 112 is coupled to the fetch stage 110 through the stage register 116a. The execute/writeback stage 112 is also coupled to the complex-execute/writeback stage 114 through the stage register 116b. The execute/writeback stage 112 is operational to read the opcodes from the stage register 116a, decode the opcodes to determine instruction types and operands, execute the instruction types to generate a result value, store the result value in the stage register 116b, and write the selected result value and/or the writeback result value into the register bank 126.

The complex-execute/writeback stage 114 is coupled to the execute/writeback stage 112 through the stage register 116b. The complex-execute/writeback stage 114 is operational to read the selected result value stored in the stage register 116b, perform complex arithmetic operations, the bitwise operations, and/or logical operations on the selected result value, and generate a writeback result value in the writeback result signal WBRES.

The decode circuit 120 is implemented as an operation code decoder. The decode circuit 120 is operational to decode the opcodes received in the opcode signal OPCODE. The decoding of an opcode determines the instruction type and one or more incoming operands. The decoded instruction type is presented in the signal INTYP. The decoded incoming operands are presented in the signal OP.

The control circuit 122 is implemented as a controller for the execute/writeback stage 112. The control circuit 122 is operational to introduce a randomness in the processing performed in the execute/writeback stage 112 to dynamically blur the power consumption of the electronic circuit 90 as seen in the power signal PWR. The instruction type and the source/destination type of operands, as decoded by the decode circuit 120, enable the control circuit 122 to know what resources are targeted by the current architectural instruction and consequently what free resources are available for random execution. In addition, the control circuit 122 is coupled to the key interface 106 to receive the key value in the key signal KEY. The random execution creates random changes in the power signal PWR thereby making a side-channel attack through power monitoring difficult.

The control circuit 122 is configured to determine one or more unused processing elements in the processing elements circuit 132 by snooping one or more incoming operands and the instruction type, control routing of one or more random operands from the register bank 126 to the unused processing elements, and control routing of a random result value generated by one of the unused processing elements into a trash register (e.g., the register 128n) of the registers 128a-128n. The power consumed by the unused processing elements in the generation of the random result value and a write of the random result value into the trash register temporally blurs a total power consumed by the electronic circuit 90. In various embodiments, the control circuit 122 may be configured to determine the unused processing elements at random in response to the key value. Where multiple unused processing elements are selected to contribute to the power blurring, the control circuit 122 selects one of the random result values to write into the trash register. The control circuit 122 may also be configured to control a read from a random one of the registers 128a-128n in response to the key value to produce the one or more random operands.

The write demultiplexer 124 is implemented as a dual-port demultiplexer. The write demultiplexer 124 has the multiple write ports 125a-125b, each configured to route one of the result value and the random result value into the registers 128a-128n in response to the write port select signal WPSEL, as generated by the control circuit 122. The write demultiplexer 124 routes the result values received at one or both write ports 125a-125b to the selected write signals WA-WN for subsequent writing into corresponding registers 128a-128n within the register bank 126. Selection of the routing between the write ports 125a-125b and the registers 128a-128n is controlled by the control circuit 122.

The register bank 126 includes the multiple registers 128a-128n. One of the registers 128a-128n may be designated as a trash register (e.g., 128n). Data stored in the registers 128a-128n is available in the read signals RA-RN.

The read select circuit 130 is implemented as a dual-path routing circuit. The read select circuit 130 is configured to route the one or more random operands from the register bank 126 to the processing elements circuit 132 in response to the operand select signal OPSEL, as generated by the control circuit 122. The read select circuit 130 routes the operands in a selected one or two of the read signals RA-RN to the selected read signals RD0-RD1. For example, the operand in the read signal RA may be routed to the selected read signal RD0 while the operand in the read signal RN is routed to the selected read signal RD1. In another example, the operand in the read signal RA may be routed to the selected read signal RD1 while the operand in the read signal RM is routed to the selected read signal RD0. Routing control of the operands is provided by the control circuit 122 via the operand select signal OPSEL.

The processing elements circuit 132 is implemented as multiple independent processing elements (or blocks). The processing elements circuit 132 is operational to perform the arithmetic operations, the bitwise operations and/or the logical operations on the operands received in the selected read signals RD0-RD1. The processing elements circuit 132 consumes power by processing the operands to generate the result values. The one or more unused processing elements are selected to process the one or more random operands in response to the datapath select signal, as generated by the control circuit 122, to generate one or more random result values. In some embodiments, the operations (or functions) may be dependent on the key value and/or the instruction type. The result values generated by the various operations are presented in the intermediate result signals PA-PN.

The block select circuit 134 is implemented as another dual-path routing circuit. The block select circuit 134 is configured to route one of the random result values and the normal result value from the processing elements circuit 132 to the register bank 126 in response to a block select signal BLKSEL, as generated by the control circuit 122. In situations where multiple random result values are created, the control circuit 122 may perform a selection to control routing of one of the random result values to the register bank 126. The block select circuit 134 routes the result values in a selected one or two of the intermediate result signals PA-PN to the selected result signals RES0-RES1. For example, the result value in the intermediate result signal PC may be routed to the selected result signal RES0 while the result value in the intermediate result signal PD is routed to the intermediate result signal RES1. In another example, the result value in the intermediate result signal PC may be routed to the selected result signal RES1 while the result value in the intermediate result signal RM is routed to the selected result signal RD0. Control of the routing is provided by the control circuit 122 via the block select signal BLKSEL.

The stage select circuit 136 is implemented as a dual-path routing circuit. The stage select circuit 136 is configured to route up to two of the normal result value, the writeback result value, and the random result value to the multiple write ports 125a-125b of the write demultiplexer 124 in response to the stage select signal STGSEL, as generated by the control circuit 122. The stage select circuit 136 routes the result values generated by the execute/writeback stage 112 and the complex-execute/writeback stage 114 to the selected write signals WR0-WR1. While the result values of the execute/writeback stage 112 are selected, the stage select circuit 136 routes the result values in the selected result signals RES0-RES1 to the selected write signals WR0-WR1 in any order. While the result value of the complex-execute/writeback stage 114 is selected, the stage select circuit 136 may route half of the bits in the writeback result signal WBRES to each of the selected write signals WR0-WR1 in any order. For example, where the writeback result signal WBRES is a 64-bit signal, the stage select circuit 136 may route 32 bits of the 64 bits to the selected write signal WR0 and the other 32 bits of the 64 bits to the selected write signal WR1. The routing is controlled by the control circuit 122 via the stage select signal STGSEL.

By way of example, the result value in the intermediate result signal PC may be routed to the selected result signal RES0 while the result value in the intermediate result signal PD is routed to the intermediate result signal RES1. In another example, the result value in the intermediate result signal PC may be routed to the selected result signal RES1 while the result value in the intermediate result signal RM is routed to the selected result signal RD0. Control of the routing of the result values is provided by the control circuit 122 via the block select signal STGSEL.

Figure 3:
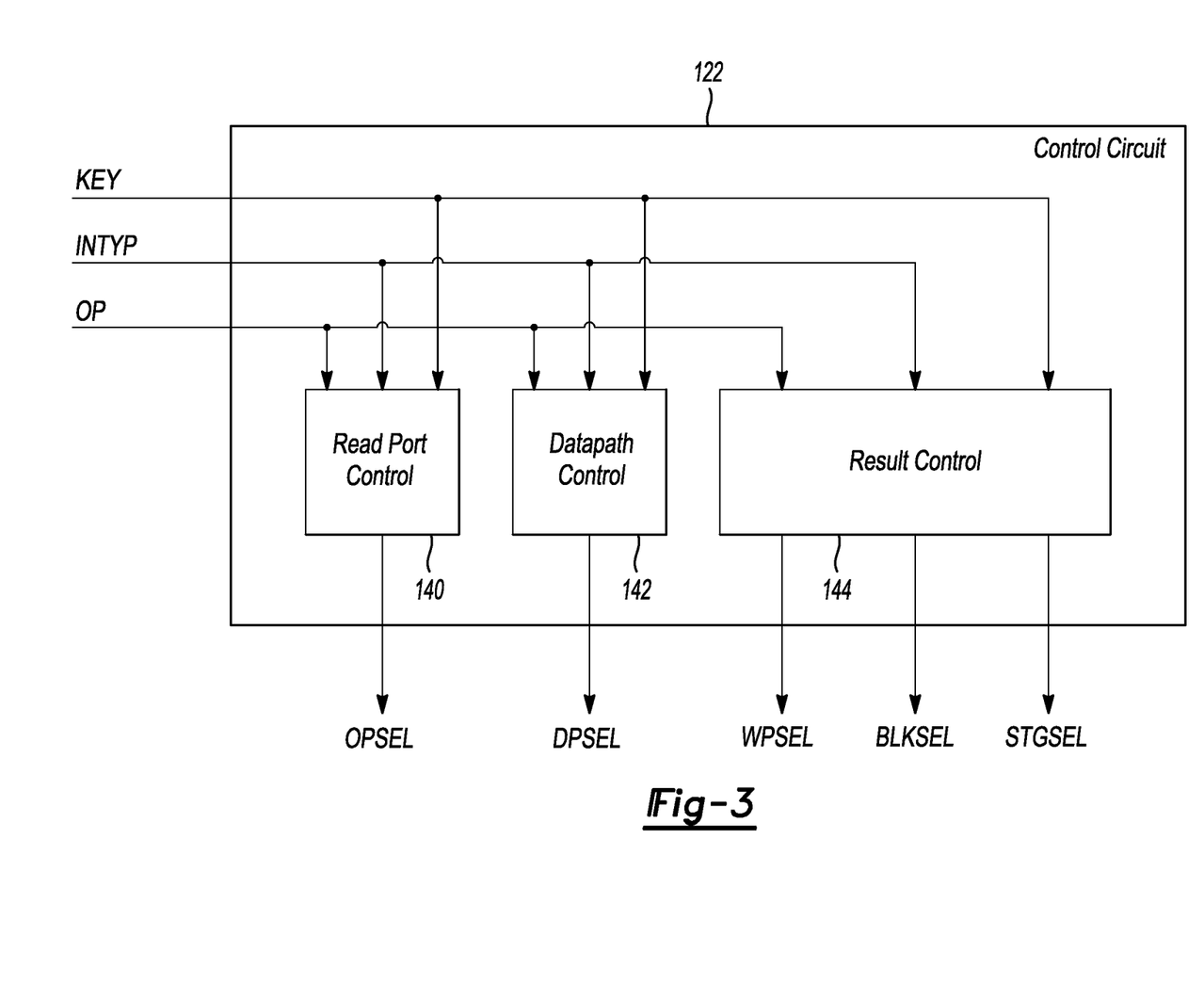
FIG. 3 is a schematic diagram of a control circuit in the pipeline in accordance with an exemplary embodiment.

Referring to FIG. 3, a schematic diagram of an example implementation of the control circuit 122 is shown in accordance with an exemplary embodiment. The control circuit 122 includes a read port control circuit 140, a datapath control circuit 142, and a result control circuit 144. The key signal KEY, the instruction type signal INTYP, and the incoming operand signal OP are received by the read port control circuit 140, the datapath control circuit 142, and the result control circuit 144. The read port control circuit 140 generates the operand select signal OPSEL. The datapath control circuit 142 generates the datapath select signal DPSEL. The result control circuit 144 generates the write port select signal WPSEL, the block select signal BLKSEL, and the stage select signal STGSEL.

The different circuits 140-144 internal to the control circuit 122 generally implement functions that snoop the instructions types and the operands, use various parts of the key value, and use knowledge of free resources in the pipeline 100 in order to control the pipeline 100. While the power blurring feature is disabled, the circuits 140-144 may control the pipeline 100 in accordance with the instruction type and the operands received from the decode circuit 120. While the power blurring feature is enabled, the circuits 140-144 control the pipeline 100 in accordance with the instruction type and the operands, similar to while the power blurring feature is disabled. In addition, the circuits 140-144 control the pipeline 100 to perform additional, random processing to blur (e.g., cause an unexpected increase in) the power consumption of the electronic circuit 90.

Enabling and disabling of the power blurring feature may be controlled by the software as executed by the processor 98 and/or by the control circuit 122. For example, special instructions recognizable by the control circuit 122 may be defined that enable the power blurring and disable the power blurring. Thus, the software may include a special start instruction to enable the power blurring prior to performing sensitive operations that are vulnerable to a side-channel attack. After the sensitive operations have concluded, the software may include a special end instruction that disables the power blurring. In some embodiments, the control circuit 122 may enable and disable the power blurring at random times based on at least the random key value.

The read port control circuit 140 is operational to control which among the registers 128a-128n are read from the register bank 126 during a current clock cycle. While the power blurring is disabled and/or while the current instruction specifies two particular operands for the current instruction, the read port control circuit 140 generates the operand select signal OPSEL to drive the two specified operands from the register bank 126 to the selected read signals RD0-RD1. While the power blurring is enabled and the current instruction specifies a single operand, the read port control circuit 140 drives the specified operand into one of selected read signals RD0 or RD1. The other selected read signal RD1 or RD0 may be driven by the read port control circuit 140b to carry a randomly selected operand from the register bank 126. While the power blurring is enabled and the current instruction does not specify an operand (e.g., a no-operation instruction), the read port control circuit 140 may select two operands at random from the register bank 126. In various embodiments, the read port control circuit 140 may use several (e.g., J) bits of the (e.g., N-bit) key value (e.g., J≤N) to compute random read addresses and generate the operand select signal OPSEL to drive the operands into the selected read signals RD0 and RD1.

The datapath control circuit 142 is operational to control the datapath select signal DPSEL to control which function(s) in the processing elements circuit 132 process the operands in the current clock cycle. While the power blurring is disabled, the datapath control circuit 142 generates the datapath select signal DPSEL in accordance with the current instruction. While the power blurring is enabled, the datapath control circuit 142 still generates the datapath select signal DPSEL in accordance with the current instruction, and furthermore identifies the unused processing elements in the processing elements circuit 132. The unused processing elements subsequently perform operations using one or both of the selected operands and so consume random amounts of power. The unused processing elements may be selected at random. Timing of the selection of the unused processing elements may also be randomized. The datapath control circuit 142 may use several (e.g., K) bits of the key value (e.g., K≤N) to randomly select and activate the unused processing elements.

The result control circuit 144 is operational to generate the block select signal BLKSEL to control transfer of the various result values from the processing elements circuit 132 to the stage register 116b and to the stage select circuit 136. While the power blurring is disabled, the result control circuit 144 generates the block select signal BLKSEL in accordance with the current instruction. While the power blurring is enabled, the result control circuit 144 still generates the block select signal BLKSEL in accordance with the current instruction, and furthermore transfers the random result value generated by one of the unused processing elements in the processing elements circuit 132 to the stage select circuit 136. The result control circuit 144 generally routes the normal result value and the random result value in the selected result signals RES0 and RES1. Allocation of the random result value between the selected result signals RES0 and RES1 may be determined at random where the normal result value is not passed to the complex-execute/writeback stage 114. The result control circuit 144 may use several (e.g., L) bits of the key value to randomly select which result values are transferred via which selected result signals RES0-RES1.

The result control circuit 144 is also operational to generate the stage select signal STGSEL to control routing of the result values in the selected result signals RES0-RES1 and the writeback result value in the writeback result signal WBRES to the write demultiplexer 124. While a writeback result value is available from the complex processing elements circuit 138, the result control circuit 144 generates the stage select signal STGSEL to cause the stage select circuit 136 to place half of the bits of the writeback result signal WBRES on the selected write signal WR0 and the other half of the bits on the selected write signal WR1. While the power blurring is disabled and no writeback result value is available, the result control circuit 144 generates the stage select signal STGSEL in accordance with the current instruction to route the normal result value into either of the selected write signals WR0-WR1. While the power blurring is enabled and no writeback result value is available, the result control circuit 144 generates the block select signal BLKSEL to route the normal result value and the random result value in any order via the selected write signals WR0-WR1.

In some pipeline designs, the amount of power used to send data from an input node of the stage select circuit 136 to the register bank 126 may be different along the two writeback paths (e.g., WR0 or WR1). For example, sending data to a particular register 128a-128n in the register bank 126 via the selected write signal WR0 may involve different physical resources (e.g., gates and wire) and so consumes more or less power than sending the same data to the same particular register 128a-128n in the selected write signal WR1. Therefore, additional randomness may be added to the total power consumption of the electronic circuit 90 by randomly selecting the writeback path to carry the normal result value and the random result value. The randomness also changes the places where the activity is happening thereby making a probing activity harder for an attacker. The result control circuit 144 may use several (e.g., M) bits of the key value (e.g., M≤N) to randomly select which writeback path carries which result value.

The result control circuit 144 is further operational to generate the write port select signal WPSEL to control routing of the result values in the selected write signals WR0-WR1 among the write signals WA-WN in the write demultiplexer 124. While a writeback result value is available from the complex processing elements circuit 138, the result control circuit 144 generates the write port select signal WPSEL to command the write demultiplexer 124 to route the two halves of the writeback result value into two of the write signals WA-WN. While the power blurring is disabled and no writeback result value is available, the result control circuit 144 generates the write port select signal WPSEL in accordance with the current instruction to route the normal result value into a destination register 128a-128n in the register bank 126. While the power blurring is enabled and no writeback result value is available, the result control circuit 144 generates the write port select signal WPSEL to route the normal result value as before and route the random result value into a trash register (e.g., register 128n) in the register bank 126. In various embodiments, the trash register 128n may be a particular one of the registers 128a-128n at a fixed register address. In other embodiments, the trash register 128n may be dynamically assigned among several available register addresses.

Figure 4:
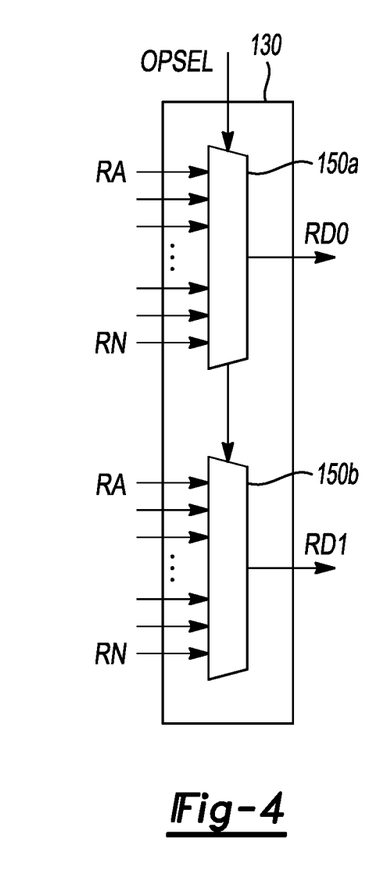
FIG. 4 is a schematic diagram of a read select circuit in the pipeline in accordance with an exemplary embodiment.

Referring to FIG. 4, a schematic diagram of an example implementation of the read select circuit 130 is shown in accordance with an exemplary embodiment. The read select circuit 130 generally includes multiple (e.g., two) operand multiplexers 150a-150b. The operand select signal OPSEL may be received by each operand multiplexer 150a-150b. The operand select signal OPSEL generally controls routing of the operands from the register bank 126 to the processing elements circuit 132. The read signals RA-RN may be received by each operand multiplexer 150a-150b.

The first operand multiplexer 150a is operational to generate the first selected read signal RD0 from among the read signals RA-RN based on the value in the operand select signal OPSEL. The second operand multiplexer 150b is operational to generate the second selected read signal RD1 from among the read signals RA-RN based on the value in the operand select signal OPSEL.

Figure 5:
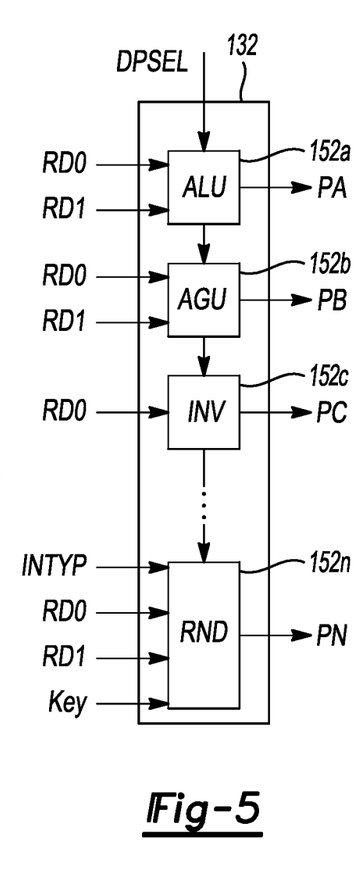
FIG. 5 is a schematic diagram of a processing elements circuit in the pipeline in accordance with an exemplary embodiment.

Referring to FIG. 5, a schematic diagram of an example implementation of the processing elements circuit 132 is shown in accordance with an exemplary embodiment. The processing elements circuit 132 generally includes multiple processing elements 152a-152n. The datapath select signal DPSEL may be received by each processing element 152a-152n. The datapath select signal DPSEL generally controls which one or more of the processing elements 152a-152n are activated to process the incoming operand(s) in the selected read signals RD0-RD1. Each processing element 152a-152n receives the selected read signals RD0-RD1. Each activated processing element 152a-152n is operational to generate a result value in a corresponding intermediate result signal PA-PN based on the operand(s). In an optional design, the processing element 152n may also receive the instruction type signal INTYP and the key signal KEY. The (random) processing element 152n may be operational to generate the random result value in the intermediate result signal PN. The random processing element 152n may utilize a random constant value to improve the randomness of the block activity and thus the randomness of the total power consumption of the electronic circuit 90.

The processing elements 152a-152n generally include a variety of functional blocks. The functions of some of the processing elements 152a-152n may be based on two operands. The functions of some processing elements (e.g., 152c) may be based on a single operand. For example, a first processing element 152a may be implemented as an arithmetic logic unit (ALU). The first processing element 152a is configured to that performs arithmetic operations and bitwise operations on integer binary values received in the selected read signals RD0-RD1. A second processing element 152b is implemented as an address generation unit (AGU). The second processing element 152b is operational to calculate addresses used by the processor 98 to access the storage element 96. A third processing element 152c is implemented as an inverter. The inverter may be operational to calculate an inverted value (e.g., 1/X) for an input value X. Other processing elements and/or other combinations of processing elements may be implemented to meet the design criteria of a particular application.

Figure 6:
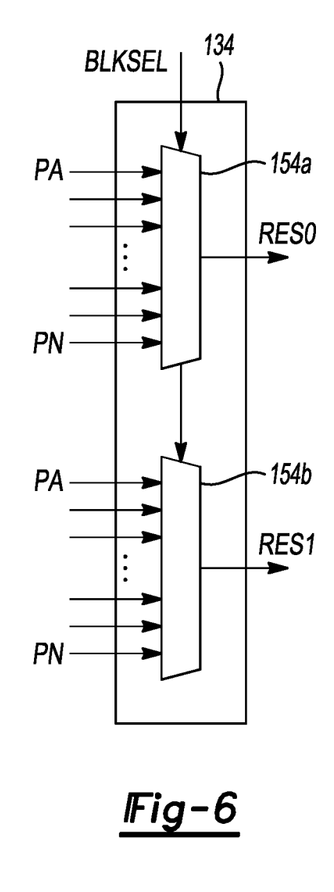
FIG. 6 is a schematic diagram of a block select circuit in the pipeline in accordance with an exemplary embodiment.

Referring to FIG. 6, a schematic diagram of an example implementation of the block select circuit 134 is shown in accordance with an exemplary embodiment. The block select circuit 134 generally includes multiple (e.g., two) block multiplexers 154a-154b. The block select signal BLKSEL may be received by each block multiplexer 154a-154b. The block select signal BLKSEL controls routing of the result values from the processing elements circuit 132 to the stage register 116b and the stage select circuit 136. The intermediate result signals PA-PN may be received by each block multiplexer 154a-154b.

The first block multiplexer 154a is operational to generate the first selected result signal RES0 from among the intermediate result signals PA-PN based on the value in the block select signal BLKSEL. The second block multiplexer 154b is operational to generate the second selected result signal RES1 from among the intermediate result signals PA-PN based on the value in the block select signal BLKSEL. While the power blurring is enabled, one of the result signals RA-RN may carry the random result value.

Figure 7:
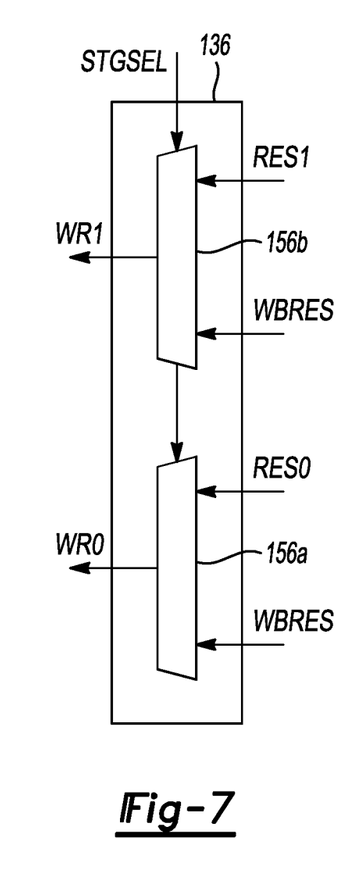
FIG. 7 is a schematic diagram of a stage select circuit in the pipeline in accordance with an exemplary embodiment.

Referring to FIG. 7, a schematic diagram of an example implementation of the stage select circuit 136 is shown in accordance with an exemplary embodiment. The stage select circuit 136 generally includes multiple (e.g., two) stage multiplexers 156a-156b. The stage select signal STGSEL may be received by each stage multiplexer 156a-156b. The stage select signal STGSEL generally controls routing of the result values from the block select circuit 134 and the complex processing elements circuit 138 to the write demultiplexer 124. The first stage multiplexer 156a may receive the first selected result signal RES0 and half of the writeback result signal WBRES. The second stage multiplexer 156b may receive the second selected result signal RES1 and the other half of the writeback result signal WBRES.

The first stage multiplexer 156a is operational to generate the first selected write signal WR0 based on the value in the stage select signal STGSEL. The second stage multiplexer 156b is operational to generate the second selected write signal WR1 based on the value in the stage select signal STGSEL. The random result value may be routed through either stage multiplexer 156a- or 156b and thus appear in either selected write signal WR0- or WR1.

Figure 8:
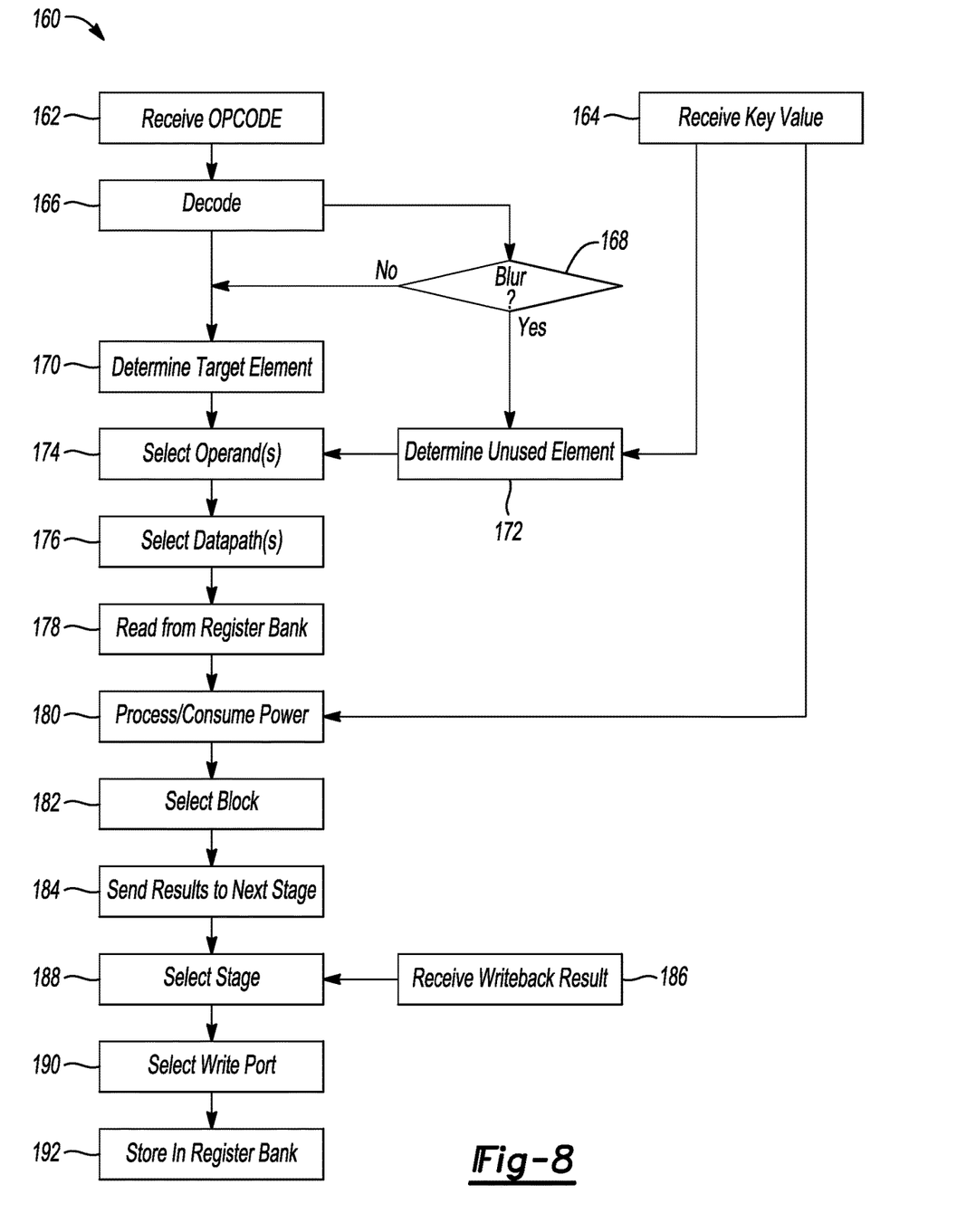
FIG. 8 is a flow diagram of a method of protecting the electronic circuit from a side-channel attack in accordance with an exemplary embodiment.

Referring to FIG. 8, a flow diagram of an example method 160 of protecting the electronic circuit 90 from a side-channel attack is shown in accordance with an exemplary embodiment. The method (or process) 160 includes a step 162, a step 164, a step 166, a step 168, a step 170, a step 172, a step 174, a step 176, a step 178, a step 180, a step 182, a step 184, a step 186, a step 188, a step 190, and a step 192. The sequence of steps is shown as a representative example. Other step orders may be implemented to meet the criteria of a particular application.

In the step 162, the decode circuit 120 receives an opcode from the fetch stage 110. In the step 164, the processor 98 receives the key value. The opcode may be decoded in the step 166 by the decode circuit 120 to determine the instruction type and associated operands. In the step 168, the control circuit 122 generally determines when the power consumed by the electronic circuit 90 may be blurred. The determination may be based on the special instructions and/or at random times.

While the power blurring is disabled, the method continues with the step 170. In the step 170, the control circuit 122 determines a target processing element 152a-152n based on the instruction type. While the power blurring is enabled, the control circuit 122 determines the target processing element 152a-152n per the step 170 and determines the unused processing elements (e.g., 152x, where x=a to n) in the step 172 to expand the total power flowing in the power signal PWR. The unused processing elements 152x among the processing elements 152a-152n are determined by snooping one or more of the incoming operands and the instruction type. In various embodiments, the determination of the unused processing elements 152x is randomized in response to the key value.

In the step 174, the control circuit 122 selects the operand(s) to be used by the processing elements circuit 132 and generates a corresponding value in the operand select signal OPSEL. The read select circuit 130 presents the selected operand(s) to the processing elements circuit 132 in response to the operand select signal OPSEL. Under various conditions, control of the operand selection routes one or more random operands from the registers 128a-128n to the unused processing elements 152x.

In the step 176, the control circuit 122 selects the datapath(s) to activate in the processing elements circuit 132. The selection is based on the instruction type while the power blurring feature is disabled. The selection is based on the instruction type and the unused processing elements 152x while the power blurring feature is enabled. The selected datapath(s) in the processing elements circuit 132 are notified by the control circuit 122 via that datapath select signal DPSEL.

In the step 178 the selected operands are read from the register bank 126 and presented to the processing elements circuit 132. In various embodiments, the read may be from a random one or two of the registers 128a-128n in response to the key value. The selected processing element(s) 152a-152n consume electrical power in the step 180 by processing the one or more selected operands to generate the result value(s). The processing may include the generation of a random result value by processing the one or more random operands in the unused processing elements 152x. The power consumed by the unused processing elements 152x in the generation of the random result value temporally blurs the total power consumed by the electronic circuit 90. In designs incorporating the random processing element 152n, the processing may be randomized based on the key value and/or the instruction type.

The control circuit 122 subsequently controls a route of the random result value to the trash register of the registers 128a-128n and a route of the normal result value to a destination register of the registers 128a-128n. The routes may be controlled through the block select signal BLKSEL, the stage select signal STGSEL and the write port signal WPSEL. The block select signal BLKSEL is used in the step 182 to control routing of the random result value into one of the selected result signals RES0 or RES1.

The normal result value may be routed to the stage register 116b via the selected result signal RES0. The stage register 116b presents the normal result values to the next stage (e.g., the complex-execute/writeback stage 114) in the step 184. A writeback result value is received by the stage select circuit 136 from the next stage in the step 186.

The stage select signal STGSEL is used to control routing of the random result value, the normal result value, and the writeback result value into the selected write signals WR0-WR1 in the step 188. The selected write signals WR0-WR1 are subsequently received at the write demultiplexer 124. In the step 190, the control circuit 122 generates the write port select signal WPSEL to control the demultiplexing of the normal result value and the random result value, or the writeback result value to the register bank 126. The register bank 126 stores the received result values in the step 192. Writing of the random result value into the trash register contributes to the temporal blurring of the total power consumed by the electronic circuit 90.

Figure 9:
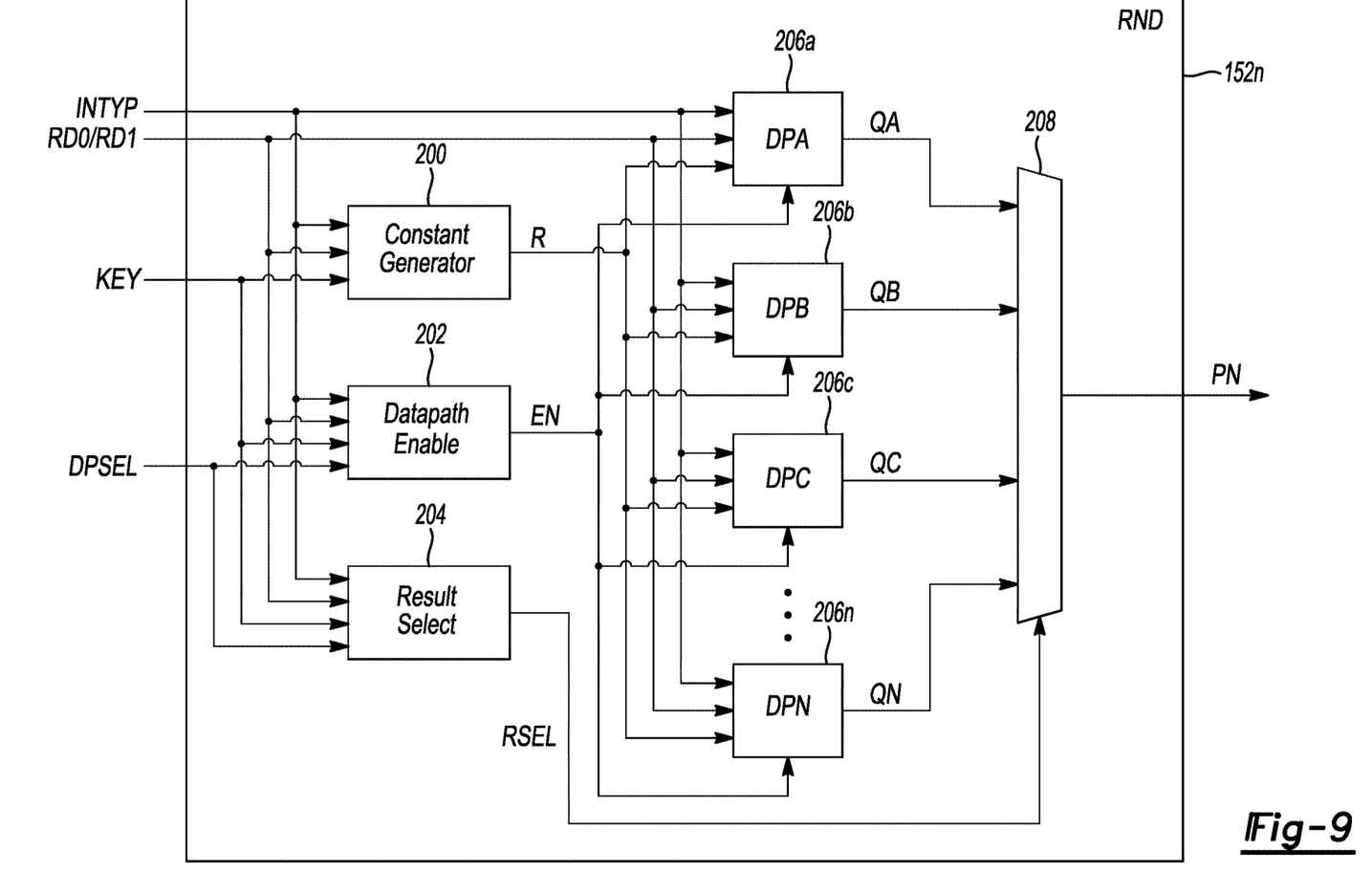
FIG. 9 is a schematic diagram of a random processing element in the pipeline in accordance with an exemplary embodiment.

Referring to FIG. 9, a schematic diagram of an example implementation of the random (RND) processing element 152n is shown in accordance with an exemplary embodiment. The random processing element 152n may be selected by the control circuit 122 as one of the unused processing elements 152x. The random processing element 152n includes a constant generator circuit 200, a datapath enable circuit 202, a result select circuit 204, multiple function circuits 206a-206n, and a function multiplexer 208. The random processing element 152n is configured to generate a random constant value in response to the key value and perform a random one or more functions based on the random constant value to consume a random amount of power.

The instruction type signal INTYP may be received by the constant generator circuit 200, the datapath enable circuit 202, the result select circuit 204, and the function circuits 206a-206n. The selected read signals RD0-RD1 may be received by the constant generator circuit 200, the datapath enable circuit 202, the result select circuit 204, and the function circuits 206a-206n. The key value signal KEY may be received by the constant generator circuit 200, the datapath enable circuit 202, and the result select circuit 204. The datapath select signal DPSEL may be received by the datapath enable circuit 202 and the result select circuit 204.

A random constant signal (e.g., R) may be generated by the constant generator circuit 200 and presented to the function circuits 206a-206n. The random constant signal R may carry a random constant value. An enable signal (e.g., EN) is generated by the datapath enable circuit 202 and conveyed to the function circuits 206a-206n. The enable signal carries commands that enable and disable the various function circuits 206a-206n. Random result signals (e.g., QA-QN) are generated by the corresponding function circuits 206a-206n and transferred to the function multiplexer 208. The random result signals QA-QN carry random result values determined by the function circuits 206a-206n. A result select signal (e.g., RSEL) is generated by the result select circuit 204 and received by the function multiplexer 208. The result select signal RSEL controls routing of the-random result values in the random result signals QA-QN to the intermediate result signal PN. The function multiplexer 208 presents the selected random result in the intermediate result signal PN.

The constant generator circuit 200 is operational to generate the random constant value. The generation may be based on one or more of the instruction type, the operands selected by the read select circuit 130, and the key value. In various embodiments, the constant generator circuit 200 may perform a Boolean XOR (or other operation) to generate constants using the key value, the operand values and/or the instruction type encoding as an input. Where the key value changes over time, the same instruction type and operand set may generate different constant values over time. The random constant value is presented in the random constant signal R.

The datapath enable circuit 202 is operational to generate the enable signal EN based on one or more of the instruction type, the operands, the key value, and the datapath select signal DPSEL. The enable signal EN is used to randomly activate one or more of the function circuits 206a-206n to process the operands and/or the random constant value, and thereby consume a random amount of additional electrical power. Where the key value changes over time, the same value in the datapath select signal DPSEL, instruction type, and operand set may activate different function circuits 206a-206n over time, enabling an effective power blurring.

The result select circuit 204 is operational to generate the result select signal RSEL based on one or more of the instruction type, the operands, the key value, and the datapath select signal DPSEL. The result select signal RSEL is used to control a selection among the random result signals QA-QN to be presented as the intermediate result signal PN. In some embodiments, the result select circuit 204 may choose one of the random result signals QA-QN from one of the function circuits 206a-206n activated by the datapath enable circuit 202 in order to be sure that the random result value is different from zero.

Each function circuit 206a-206n is implemented as a processing function_(o datapath DPA-DPN) that accepts one or more of the instruction type, the operands, and the random constant value as input parameters, and generates one of the random result signals QA-QB. Each function circuit 206a-206n is operational to perform a respective function in response to the input parameters and contribute to the power consumption of the electronic circuit 90. In various embodiments, each function circuit 206a-206n is designed to consume a different amount of power.

In various embodiments, the function circuits 206a-206n may be combinatorial circuits such as one or more additions, one or more multiplications, one or more permutations, one or more specific functions, and so on. In some designs, at least one of the function circuits 206a-206n may implement a Boolean XOR function using one or more of the operands, the instruction type, the datapath select value and/or the key value as the input parameter. Other functions may be implemented to meet the design criteria of a particular application. The random execution in the function circuits 206a-206n creates random changes in the power signal PWR. The random changes in the power signal PWR make side-channel attacks difficult on the electronic circuit 90. The function multiplexer 208 is operational to route one of the random result signals QA-QN to the intermediate result signal PN in response to the result select signal RSEL.

Figure 10:
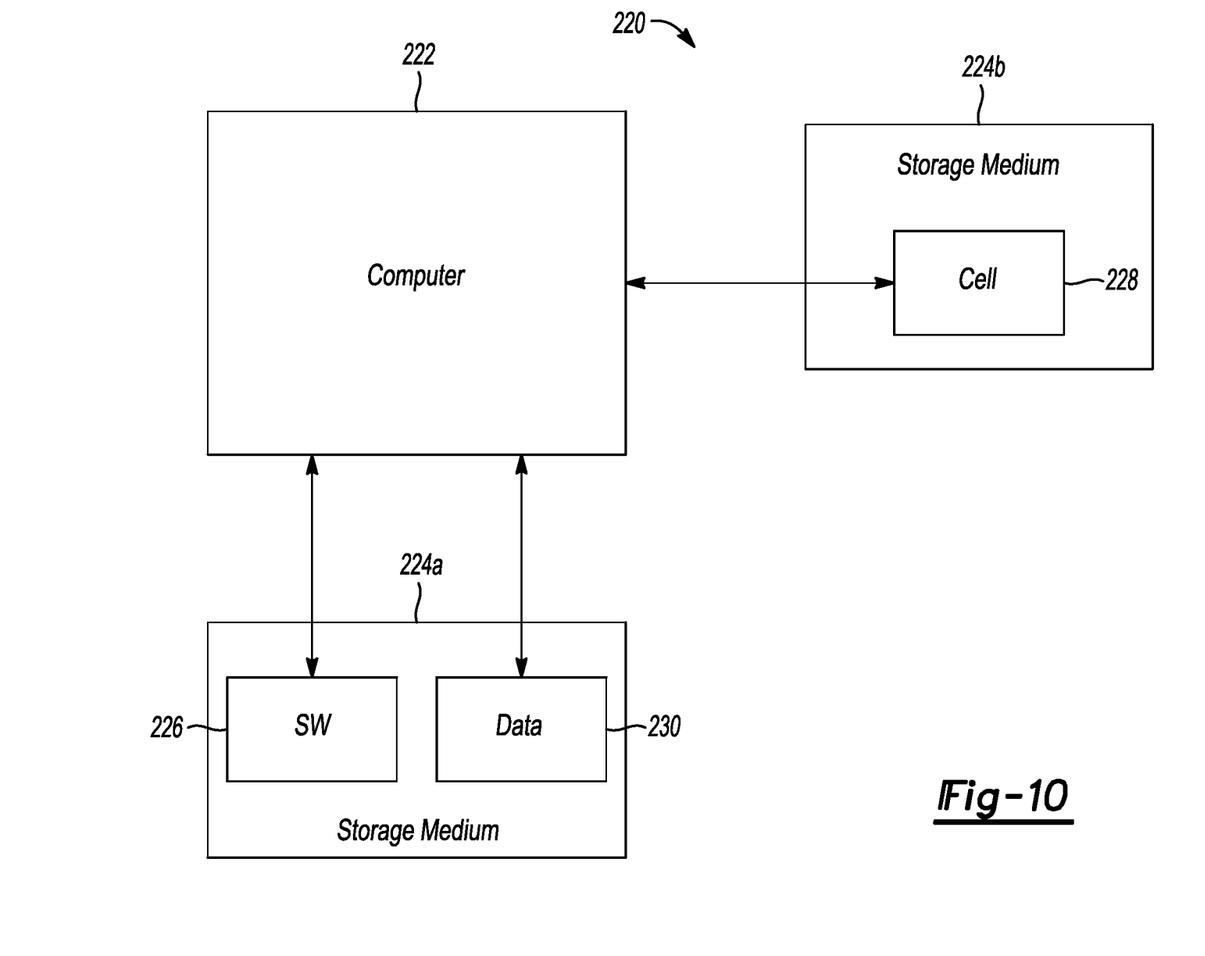
FIG. 10 is a schematic diagram of a computer system in accordance with an exemplary embodiment.

Referring to FIG. 10, a schematic diagram of an example computer system 220 is shown in accordance with an exemplary embodiment. The computer system 220 is operational to generate a library cell in a non-transitory computer readable storage. The library cell defines the electronic circuit 90 in software and stores the cell in a cell library for reuse in later design applications. Simulation models may also be created of the electronic circuit 90. Such models may be exercised by a simulator to verify proper functionality and performance of the designs.

The computer system 220 includes a computer 222 and one or more storage media 224a-224b. A first storage medium (e.g., 224a) may contain one or more software programs 226 readable and executable by the computer 222. The first storage medium 224a may also record a data file 230 that defines one or more designs of the electronic circuit 90. A library cell 228 that stores data defining one or more designs of the electronic circuit 90 may reside in a second storage medium (e.g., 224b). The first storage medium 224a may be a computer readable storage medium. The second storage medium 224b may be a non-transitory computer readable storage medium.

The software programs 226 may be read and executed by the computer 222 to implement the process of generating the library cell 228 for the electronic circuit 90. The data file 230 may be accessed as appropriate during execution. In various embodiments, the library cell 228 may include a number of views, including layout, schematic, symbol, abstract, other logical or simulation views, and timing of the electronic circuit 90. In some embodiments, the software programs 226, the data file 230 and the library cell 228 may be stored in the same storage medium 224a or 224b.

In one or more embodiments of the electronic circuit, the control circuit includes an interface configured to receive a key value, and the control circuit is configured to determine the unused processing elements at random in response to the key value.

In one or more embodiments of the electronic circuit, the control circuit includes an interface configured to receive a key value, and the control circuit is configured to control a read from a random one of the plurality of registers in response to the key value to produce the one or more random operands.

In one or more embodiments, the electronic circuit includes a read select circuit configured to route the one or more random operands from the register bank to the plurality of processing elements in response to an operand select signal, and the control circuit is configured to generate the operand select signal.

In one or more embodiments of the electronic circuit, the control circuit is further configured to generate a datapath select signal, and the unused processing elements are selected to process the one or more random operands in response to the datapath select signal.

In one or more embodiments, the electronic circuit includes a block select circuit configured to route the random result value from the plurality of processing elements to the register bank in response to a block select signal, and the control circuit is configured to generate the block select signal.

In one or more embodiments, the electronic circuit includes a write demultiplexer having a plurality of write ports each configured to route one of the plurality of result values and the random result value into the plurality of registers in response to a write port select signal, and the control circuit is configured to generate the write port select signal.

In one or more embodiments, the electronic circuit includes a pipeline having a plurality of stages, and the plurality of processing elements, the register bank, and the control circuit are disposed in an execute stage of the pipeline.

In one or more embodiments of the electronic circuit, a writeback stage of the pipeline is configured to generate a writeback result value, and a stage select circuit is configured to route up to two of the plurality of result values, the writeback result value, and the random result value to plurality of write ports of the write demultiplexer in response to a stage select signal.

In one or more embodiments of the electronic circuit, the one of the unused processing elements is a random processing element of the plurality of elements, the random processing element is configured to generate a random constant value in response to a key value, and the random processing element is configured to perform a random one or more of a plurality of functions based on the random constant value to consume a random amount of the power.

In one or more embodiments, the method includes receiving a key value, and the determination of the unused processing elements is randomized in response to the key value.

In one or more embodiments, the method includes receiving a key value, and controlling a read from a random one of the plurality of registers in response to the key value to produce the one or more random operands.

In one or more embodiments, the method includes generating an operand select signal, and routing the one or more random operands from the plurality of registers to the plurality of processing elements in response to the operand select signal.

In one or more embodiments, the method includes generating a datapath select signal, and the unused processing elements are selected to process the one or more random operands in response to the datapath select signal.

In one or more embodiments, the method includes generating a block select signal, and routing the random result value from the plurality of processing elements to the plurality of registers in response to the block select signal.

In one or more embodiments, the method includes generating a write port select signal, and routing one of the plurality of result values and the random result value through a plurality of write ports into the plurality of registers in response to the write port select signal.

In one or more embodiments of the non-transitory computer readable storage medium, the control circuit includes another interface configured to receive a key value, and the control circuit is configured to determine the unused processing elements at random in response to the key value.

In one or more embodiments of the non-transitory computer readable storage medium, the control circuit includes another interface configured to receive a key value, and the control circuit is configured to read from a random one of the plurality of registers in response to the key value to produce the one or more random operands.

While the best modes for carrying out the disclosure have been described in detail, those familiar with the art to which this disclosure relates will recognize various alternative designs and embodiments for practicing the disclosure within the scope of the appended claims.

What is claimed is:

1. An electronic circuit comprising:
    a plurality of processing elements that consumes power by processing a plurality of operands to generate a plurality of result values;
    a register bank having a plurality of registers; and
    a control circuit configured to determine one or more unused processing elements among the plurality of processing elements by snooping one or more incoming operands and an instruction type, control routing of one or more random operands from the register bank to the unused processing elements, and control routing of a random result value generated by one of the unused processing elements into a trash register of the plurality of registers, wherein the power consumed by the unused processing elements in the generation of the random result value and a write of the random result value into the trash register temporally blurs a total power consumed by the electronic circuit.

2. The electronic circuit according to claim 1, wherein the control circuit includes an interface configured to receive a key value, and the control circuit is further configured to determine the unused processing elements at random in response to the key value.

3. The electronic circuit according to claim 1, wherein the control circuit includes an interface configured to receive a key value, and the control circuit is further configured to control a read from a random one of the plurality of registers in response to the key value to produce the one or more random operands.

4. The electronic circuit according to claim 1, further comprising a read select circuit configured to route the one or more random operands from the register bank to the plurality of processing elements in response to an operand select signal, wherein the control circuit is further configured to generate the operand select signal.

5. The electronic circuit according to claim 1, wherein the control circuit is further configured to generate a datapath select signal, and the unused processing elements are selected to process the one or more random operands in response to the datapath select signal.

6. The electronic circuit according to claim 1, further comprising a block select circuit configured to route the random result value from the plurality of processing elements to the register bank in response to a block select signal, wherein the control circuit is further configured to generate the block select signal.

7. The electronic circuit according to claim 1, further comprising a write demultiplexer having a plurality of write ports each configured to route one of the plurality of result values and the random result value into the plurality of registers in response to a write port select signal, wherein the control circuit is further configured to generate the write port select signal.

8. The electronic circuit according to claim 7, further comprising a pipeline having a plurality of stages, wherein the plurality of processing elements, the register bank, and the control circuit are disposed in an execute stage of the pipeline.

9. The electronic circuit according to claim 8, further comprising:
    a writeback stage of the pipeline configured to generate a writeback result value; and
    a stage select circuit configured to route up to two of the plurality of result values, the writeback result value, and the random result value to plurality of write ports of the write demultiplexer in response to a stage select signal.

10. The electronic circuit according to claim 1, wherein one of the unused processing elements is a random processing element of the plurality of elements, the random processing element is configured to generate a random constant value in response to a key value, and the random processing element is configured to perform a random one or more of a plurality of functions based on the random constant value to consume a random amount of the power.

11. A method of protecting a circuit from a side-channel attack comprising:
consuming power by processing one or more operands in a plurality of processing elements of the circuit to generate a plurality of result values;
determining one or more unused processing elements among the plurality of processing elements by snooping one or more incoming operands and an instruction type;
controlling a route of one or more random operands from a plurality of registers to the unused processing elements;
generating a random result value by processing the one or more random operands in one of the unused processing elements; and
controlling an additional route of the random result value to a trash register of the plurality of registers, wherein the power consumed by the unused processing elements in the generation of the random result value and a write of the random result value into the trash register temporally blurs a total power consumed by the circuit.

12. The method according to claim 11, further comprising:
receiving a key value, wherein the determination of the unused processing elements is randomized in response to the key value.

13. The method according to claim 11, further comprising:
receiving a key value; and
controlling a read from a random one of the plurality of registers in response to the key value to produce the one or more random operands.

14. The method according to claim 11, further comprising:
generating an operand select signal; and
routing the one or more random operands from the plurality of registers to the plurality of processing elements in response to the operand select signal.

15. The method according to claim 11, further comprising:
generating a datapath select signal, wherein the unused processing elements are selected to process the one or more random operands in response to the datapath select signal.

16. The method according to claim 11, further comprising:
generating a block select signal; and
routing the random result value from the plurality of processing elements to the plurality of registers in response to the block select signal.

17. The method according to claim 11, further comprising:
generating a write port select signal; and
routing one of the plurality of result values and the random result value through a plurality of write ports into the plurality of registers in response to the write port select signal.

18. A non-transitory computer readable storage medium storing a library cell defining an electronic circuit, the electronic circuit comprising:
an interface configured to receive power;
a plurality of processing elements coupled to the interface and consumes the power by processing a plurality of operands to generate a plurality of result values;
a register bank having a plurality of registers; and
a control circuit configured to determine one or more unused processing elements among the plurality of processing elements by snooping one or more incoming operands and an instruction type, control routing of one or more random operands from the register bank to the unused processing elements, and control routing of a random result value generated by one of the unused processing elements into a trash register of the plurality of registers, wherein the power consumed by the unused processing elements in the generation of the random result value and a write of the random result value into the trash register temporally blurs a total power consumed by the electronic circuit.

19. The non-transitory computer readable storage medium according to claim 18, wherein the control circuit includes another interface configured to receive a key value, and the control circuit is further configured to determine the unused processing elements at random in response to the key value.

20. The non-transitory computer readable storage medium according to claim 18, wherein the control circuit includes another interface configured to receive a key value, and the control circuit is further configured to read from a random one of the plurality of registers in response to the key value to produce the one or more random operands.

* * * * *